United States Patent [19]
Pinnavaia et al.

[11] Patent Number: 5,114,691
[45] Date of Patent: May 19, 1992

[54] PROCESS USING SORBENTS FOR THE REMOVAL OF $SO_x$ FROM FLUE GAS

[75] Inventors: Thomas J. Pinnavaia; Jayantha Amarasekera, both of East Lansing; Christine A. Polansky, Ithaca, all of Mich.

[73] Assignee: Board of Trustees operating Michigan State University, East Lansing, Mich.

[21] Appl. No.: 535,147

[22] Filed: Jun. 8, 1990

Related U.S. Application Data

[63] Continuation-in-part of Ser. No. 466,984, Jan. 18, 1990.

[51] Int. Cl.$^5$ ............................ B01J 8/00; C01B 17/00
[52] U.S. Cl. ..................................... 423/244; 252/190
[58] Field of Search ................... 423/244 A, 244 R; 252/190

[56] References Cited

U.S. PATENT DOCUMENTS

| | | |
|---|---|---|
| 3,699,037 | 1/1972 | Annouser et al. |
| 3,796,792 | 2/1974 | Miyata |
| 3,835,031 | 3/1974 | Bertolanci et al. |
| 3,879,523 | 7/1975 | Miyata |
| 3,879,525 | 1/1975 | Miyata |
| 4,153,534 | 2/1979 | Vasalos |
| 4,454,244 | 9/1984 | Woltermann |
| 4,472,532 | 11/1984 | Mooi |
| 4,492,678 | 3/1985 | Yoo |
| 4,774,212 | 2/1988 | Drezdon |
| 4,952,382 | 8/1990 | Van Brockhaven ............... 423/244 |

FOREIGN PATENT DOCUMENTS

A278535 8/1988 European Pat. Off.

OTHER PUBLICATIONS

Komppa, V., "Dry Adsorption Processes for Removal of $SO_X$ and $NO_X$ in Flue Gases-a Review", *Paperii ja puu* 5 401 to 405 (1986).
Kocaefe & Karman in Cand. J. Chem. Eng., 63 971 to 977 (1985).
Suib, S. L., et al., in Solid State Ionics, 26, 77 to 86 (1988).
Reichle, W. T. in Chemtech 58 to 63 (1986).
Pinnavaia and Kwon in J. Am. Chem. Soc., 110 3653 (1988).
Reichle in J. Catal. 101, 352 to 359 (1986).
Neuwmann et al. in Z. Electrochem. 38, 304 to 310 (1932).
Kwon, T. and Pinnavaia, T. J., "Pillaring of a Layered Double Hydroxide by Polyoxometalates with Keggin--Ion Structures", Chemistry of Materials, 1, 381 to 383 (1989).

*Primary Examiner*—Gregory A. Heller
*Attorney, Agent, or Firm*—Ian C. McLeod

[57] ABSTRACT

A process of removing noxious sulfur oxides from gas streams using heated layered double hydroxide (LDH) sorbents is described. The sorbent compositions contain metal components incorporated into the galleries of the LDH structures in the form of metal-containing oxoanions, to promote the oxidation of sulfur dioxide.

24 Claims, 4 Drawing Sheets

PROCESS USING SORBENTS FOR THE REMOVAL OF $SO_x$ FROM FLUE GAS

CROSS-REFERENCE TO RELATED APPLICATION

This application is a continuation-in-part of Ser. No. 07/466,984, filed Jan. 18, 1990.

BACKGROUND OF THE INVENTION

(1) Field of the Invention

The present invention relates to a process for using sorbents for the removal of sulfur dioxide and sulfur trioxide from gas mixtures. In particular, the present invention relates to the use of crystalline layered double hydroxide with an interlayer of an ion which oxidizes sulfur dioxide to sulfur trioxide.

(2) Prior Art

In fossil-fuel-fired power plants, the sulfur content of the feed coal is oxidized during combustion to sulfur oxides ($SO_2$ and $SO_3$, commonly referred to as "$SO_x$"), which are released through stacks to the atmosphere, and are responsible for deposition as "acid rain". Analyses of flue gas produced by power plants burning coal before desulfurization, show 0.5% - 0.2% $SO_2$ and about 0.005% $SO_3$. Control of $SO_x$ emission is mandated by the U.S. Environmental Protection Agency (EPA), and various studies are under way to develop methods for its removal from flue gas streams.

Formation of $SO_x$ in combustion processes can be reduced by modifying the burner design and combustion system, by changing the operating conditions and by using fuels with lower sulfur contents. The most popular and inexpensive method of reducing $SO_x$ emission is the addition of reactive dry sorbents with the fuel. Accordingly at present, $SO_x$ removal is most often accomplished by using lime (CaO) or lime stone ($CaCO_3$). Several other basic sorbents like MgO, ZnO also are found to be effective in removing $SO_x$. For a review on dry sorbents see for example, Komppa, V., "Dry Adsorption Processes for Removal of $SO_x$ and $NO_x$ in Flue Gases—a review," *Paperii ja Puu*, 5, 401 to 405 (1986).

Use of Group 2 (formerly Group IIA) metal oxides such as magnesium and calcium oxides as $SO_x$ sorbents has been disclosed in several patent disclosures and recent examples include U.S. Pat. Nos. 3,835,031 and 3,699,037. Several other metal oxides of varying effectiveness as $SO_x$ sorbents are described in U.S. Pat. No. 4,153,534 which include oxides such as sodium, scandium, titanium, iron, chromium, molybdenum, manganese, cobalt, nickel, copper, zinc, cadmium, rare earth metals, and lead.

In typical coal-fired power plants the ground sorbent, for example lime or limestone, is added into boilers along with coal or sprayed into towers as a slurry to contact the flue gas. The $SO_2$ reacts with calcium hydroxide to form a calcium sulfite slurry which is then partially oxidized with air to calcium sulfate. In this way the sulfur oxides are retained as harmless solid compounds which can be removed from the stack gas by electrostatic precipitation or other standard methods. Such a process is potentially attractive for retrofitting existing power plants since no major structural alterations are required.

A major problem with this type of process is low utilization of the oxide sorbents. The rate of adsorption of $SO_x$ declines rapidly with increasing conversion, due to mass transfer limitation and low reactivity of $SO_2$. Hence in the relatively short contact time available, only a small fraction of the sorbent reacts. In principle the problem of low utilization of the sorbents may be solved by reducing the particle size, but in practice, the particle size required for a reasonable level of utilization may be too small to achieve economically by conventional grinding or fragmentation methods.

Thermodynamic calculations indicate that the capture of sulfur trioxide with metal oxides is more favorable compared to sulfur dioxide. Several experimental results have suggested that catalytic oxidation of sulfur dioxide to sulfur trioxide can be beneficial for stack gas desulfurization. Kocaefe & Karman in *Cand. J. Chem. Eng.*, 63, 971 to 977 (1985) has shown that the rate of reaction of $SO_3$ with Ca, Mg and ZnO is greater than that of sulfur dioxide with the same oxides under identical conditions. Furthermore, inclusion of $Fe_2O_3$ (as a $SO_2$ oxidation catalyst) leads to more effective utilization of the lime. The addition of a small amount of $Fe_2O_3$ gave both a more rapid initial uptake rate and a much higher final conversion of the lime (80-90%). In the absence of an oxidation catalyst the rate of $SO_2$ absorption declined sharply at about 70% conversion.

A similar approach has been employed in designing $SO_x$ sorbents for fluid catalytic cracking (FCC) processing of petroleum. These sorbents, among other things, are mostly alkaline earth metal spinels containing one or more other metal components capable of oxidizing sulfur dioxide. For example, U.S. Pat. Nos. 4,472,532 and 4,492,678 relate to the incorporation of iron, chromium, vanadium, manganese, gallium, boron, cobalt, platinum, and cerium as oxidation catalysts.

Therefore, in designing improved sorbents for $SO_x$ removal, one must synthesize materials that will (i) oxidize $SO_2$ to $SO_3$, (ii) chemisorb the $SO_3$ formed, and (iii) be able to release the adsorbed $SO_x$ for the regeneration of the sorbents or form stable materials for the safe deposition of the spent solid sorbents. The $SO_x$ emitted from these spent sorbents can be captured safely and can be utilized in sulfuric acid or sulfur production.

European Patent Application EP-A 278 535 has recently described a catalyst composition suitable for the refining of heavy sulfur- and metal-containing petroleum feeds. Thus, the catalyst composition according to the disclosure contained a catalytically active zeolitic material such as ZSM-5, ZSM-11 etc. for the conversion of hydrocarbons, an anionic clay material with an LDH structure for the binding and removal of sulfur oxides, and a matrix material such as kaolin or alumina. Preferred catalyst compositions contained 1 to 30 percent amounts of anionic clay compositions, based on total catalyst composition.

There is a need for sorbent compositions suitable for diminishing $SO_x$ from flue gas streams particularly from coal-fired power plants. There is a need to develop sorbent compositions which give better $SO_x$ uptake in shorter time duration to overcome the low utilization of common oxide sorbents such as CaO and MgO due to mass transfer limitation and low reactivity of $SO_2$.

LDHs are a group of anionic clay minerals. These have positively charged sheets of metal hydroxides, between which are located anions and some water molecules. Most common LDHs are based on double hydroxides of such main group metals as Mg, and Al and transition metals such as Ni, Co, Cr, Zn and Fe etc. These clays have a structure similar to brucite

[Mg(OH)$_2$] in which the magnesium ions are octahedrally surrounded by hydroxyl groups with the resulting octahedra sharing edges to form infinite sheets. In the LDHs, some of the magnesium is isomorphously replaced by a trivalent ion, such as Al$^{3+}$. The Mg$^{2+}$, Al$^{3+}$, OH$^-$ layers are then positively charged, necessitating charge balancing by insertion of anions between the layers.

One such anionic clay is hydrotalcite in which the carbonate ion is the interstitial anion, and has the idealized unit cell formula [Mg$_6$Al$_2$(OH)$_{16}$](CO$_3$)·4H$_2$O. However, the ratio of Mg/Al in hydrotalcite-like can vary between 1.7 and 4 and various other divalent and trivalent ions may be substituted for Mg and Al. In addition, the anion which is carbonate in hydrotalcite, can be varied in synthesis by a large number of simple anions such as NO$_3^-$, Cl$^-$, OH$^-$, SO$_4^{2-}$ etc. These LDHs, based on their structure, fall into the Pyroaurite-Sjogrenite group, where brucite-like layers carrying a net positive charge alternate with layers in which the oxygen atoms of carbonate groups and water molecules are distributed on a single set of sites.

Hydrocalumite and related synthetic compounds also have a layered structure in which positively charged metal hydroxide layers alternate with the interlayers containing anions and water. The hydroxide layers contain specific combinations of metal ions derived from on one hand divalent calcium cations and on the other from trivalent cations of metals such as iron, or more particularly, aluminum. The interlayers contain anions such as OH$^-$, SO$_4^{2-}$, Cl$^-$, NO$_3^-$ and, in particular CO$_3^{2-}$. The general formula for the group is [Ca$_2$M$^{3+}$(OH)$_6$]X·yH$_2$O, where M$^{3+}$ is a tripositive ion and typically Al$^{3+}$, X is a singly charged anion or equal amounts of more highly charged ones, and y is between 2 and 6. As in the Pyroaurite-Sjogrenite group, principal layers alternate with inter-layers, the principal layers having the composition [Ca$_2$M$^{3+}$(OH)$_6$]$^+$ and the interlayers consisting of water molecules and anion X. However, because of the difference in size between the Ca$^{2+}$ and Al$^{3+}$ ions, the M$^{2+}$:M$^{3+}$ ratio is fixed at 2:1 and their arrangement is ordered. The only known natural mineral in the group is hydrocalumite the composition of which is approximately [Ca$_2$Al(OH)$_6$](OH)$_{0.75}$(CO$_3$)$_{0.125}$·2.5H$_2$O, but there are many synthetic analogues such as [Ca$_2$Fe(OH)$_6$](SO$_4$)$_{0.5}$·3H$_2$O, [Ca$_2$Al(OH)$_6$](OH)·6H$_2$O etc.

The syntheses of LDHs are generally simple, and the so-called "precipitation method" is most popular. If a carbonate-containing product is desired, then the aqueous solution of magnesium and aluminum salts, i.e., nitrate, or chloride, is added to an aqueous solution of sodium hydroxide-carbonate with good mixing at room temperature. The resulting amorphous precipitate is then heated for several hours at 60° to 200° C. to obtain a crystalline material. Washing and drying complete the synthesis in quantitative yield. By employing this precipitation method, replacement of all or part of Mg$^{2+}$ with other M$^{II}$ions such as Ca$^{2+}$, Zn$^{2+}$, Cu$^{2+}$ etc., or replacement of Al$^{3+}$ with other M$^{III}$ions such as Fe$^{3+}$, Cr$^{3+}$ etc., is also possible.

Another important aspect of the synthesis of these materials is the variation of the nature of the interstitial anion. The preparation of hydrotalcite-like materials with anions other than carbonate in pure form requires special procedures, because LDH incorporates carbonate in preference to other anions. Most of the time the smaller anions are introduced to the LDH structure, via the precipitation method by using the desired anion solutions instead of carbonate. However, in these methods the synthesis has to be carried out in an anaerobic condition to prevent carbonate contamination from the atmospheric carbon dioxide. These methods of preparation of LDHs have been described in prior art publications, particular reference being made to the following review journal articles by S. L. Suib et al., in *Solid State Ionics*, 26, 77 to 86 (1988), and W. T. Reichle in CHEMTECH, 58 to 63 (1986).

Process for the synthesis of hydrotalcite-like clays also have been the subject of a number of patents. Miyata et al in U.S. Pat. Nos. 3,796,792, 3,879,523 and 3,879,525 describe hydrotalcite-like derivatives with both cationic layer and anionic substitution including the smaller transition metal anions like CrO$_4^{2-}$, MoO$_4^{2-}$ and Mo$_2$O$_7^{2-}$. Both composition and preparative methods are described, and the compositions are said to be useful for catalytic purposes, absorbents, desiccants and the like. Synthetic hydrotalcite-like derivatives with small anions, including anions of transition elements, and also large organic anions such as long chain aliphatic dicarboxylates, are shown to catalyze aldol condensation effectively.

Incorporation of larger anions, such as transition metal polyoxoanions into the LDH gallery is not easy. This requires ion-exchange techniques subsequent to the LDH synthesis. Pinnavaia and Kwon in J. Am. Chem. Soc., 110, 3653 (1988) have demonstrated the pillaring of several polyoxometalles including V$_{10}$O$_{28}^{6-}$ into the hydrotalcite structure containing Zn and Al metal ions in the layers. In U.S. Pat. No. 4,452,244 by Woltermann disclosed the preparation of several polyoxometallate-LDHs. However, no XRD or analytical data were given to establish the purity of those materials. Recently, U.S. Pat. No. 4,774,212 by Drezdon disclosed the preparation of several Mg/Al hydrotalcite-like materials containing transition metal polyoxoanions.

The nature of the thermal decomposition of LDHs especially the hydrotalcite-like materials, have been studied in detail. For example, upon thermolysis, hydrotalcite [Mg$_6$Al$_2$(OH)$_{16}$](CO$_3$)·4H$_2$O loses weight in two stages. First, it loses the four interstitial water molecules when heated to 200° C., while retaining the skeletal hydroxide and the interlayer carbonate. Additional heating from 275° C. to 450° C. results in the simultaneous loss of hydroxyl groups and carbonate as water and carbon dioxide, respectively. These magnesium aluminum solid solutions have the sodium chloride type structure with cations deficiencies. Reichle in J. Catal. 101, 352 to 359 (1986) has shown that this heating of hydrotalcite was accompanied by an increase in the surface area from about 120 to about 230 m$^2$/g (N$_2$/BET) and a doubling of pore volume (0.6 to 1.0 cm$^3$/g, Hg intrusion). Further heating of these solid solutions to higher temperatures causes lowering of surface area as well as reactivity. At 1000° C., the formation of MgO and the spinel phase, MgAl$_2$O$_4$ has been observed.

OBJECTS

It is therefore an object of the present invention to provide novel sorbent compositions which oxidize SO$_2$ to SO$_3$, remove the SO$_3$ and then are regeneratable for reuse. These and other objectives will be increasingly apparent by reference to the following description and the drawings.

IN THE DRAWINGS

GENERAL DESCRIPTION

Figure 1:
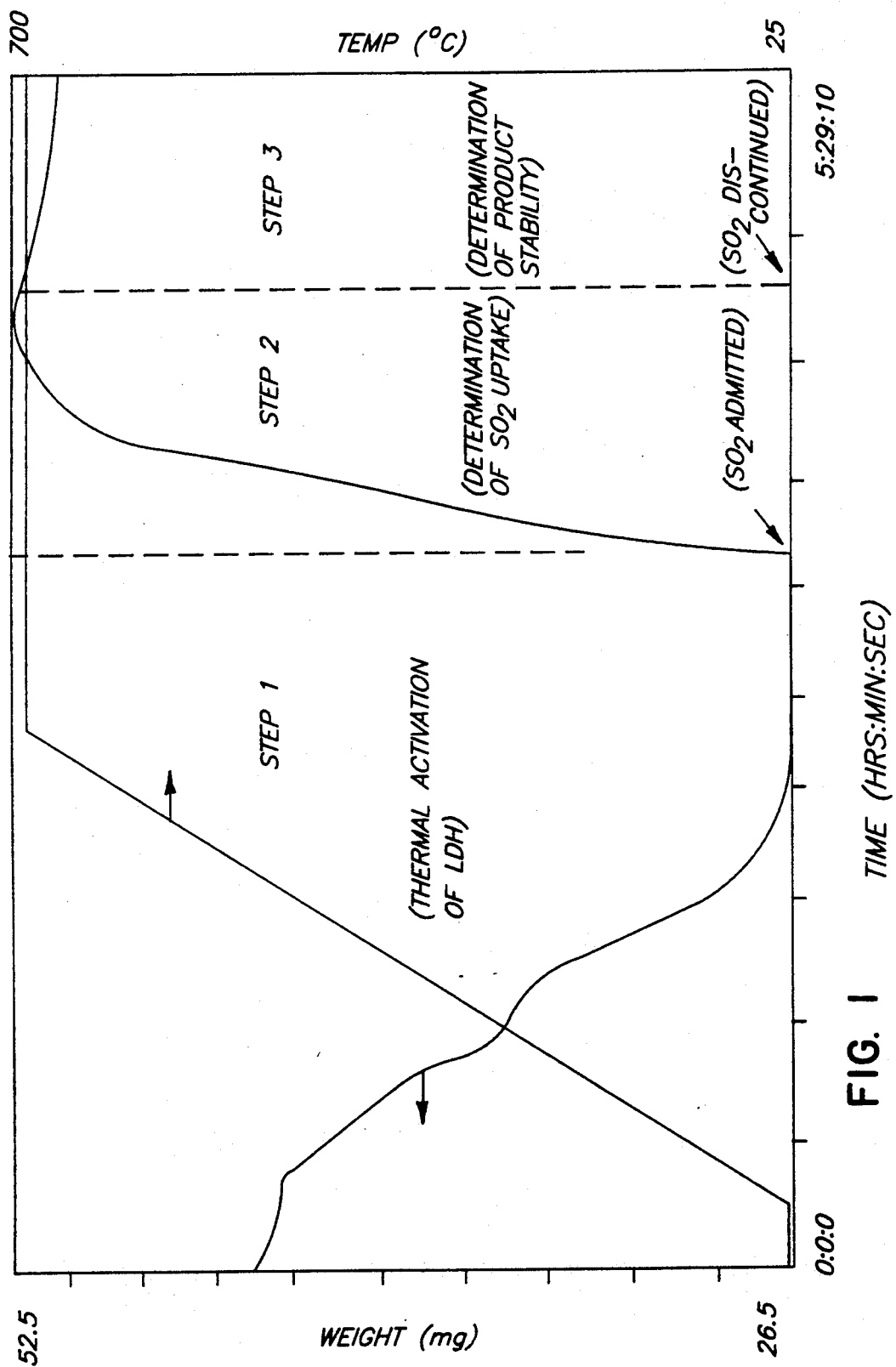
FIG. 1 is a graph of a thermogravimetric analysis (TGA) plot for $SO_2$ uptake by $[Mg_6Al_2(OH)_{16}](FeO_4) \cdot xH_2O$ as the layered double hydroxide (LDH).

The present invention relates to a process for removing the $SO_x$ components from flue gas and other gas streams which comprises contacting the said gas stream with a heated sorbent composition wherein the said sorbent is selected from the group consisting of a crystalline layered double hydroxide structure of the formula:

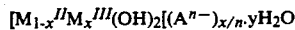

$$[M_{1-x}^{II}M_x^{III}(OH)_2[(A^{n-})_{x/n} \cdot yH_2O$$

wherein $M^{II}$ is a divalent metal cation and $M^{III}$ is a trivalent metal cation selected from the group consisting of metal cations which form metal oxides and which are capable of reacting with $SO_2$ to form metal sulfites and $SO_3$ to form metal sulfates, A is an interlayer anion of charge n- which comprises at least one metal atom which provides oxidation of sulfur dioxide to sulfur trioxide in an amount sufficient that said layered double hydroxide structure promotes the oxidation of the sulfur dioxide to the sulfur trioxide at sulfur dioxide oxidation conditions, x is between 0.8 to 0.12 and a heat treated derivative of the double hydroxide.

Thermal decomposition of LDHs, leads to the formation of active metal oxides with fairly high basic character (pKa $\leq$ 35) and high surface area. These thermally treated materials should have exceptionally well-dispersed reactive metal centers, as judged from their catalytic properties. These properties have lead us to synthesize and to utilize thermally treated LDH materials as suitable sorbents for flue gas desulfurization. The $SO_2$ oxidation catalysts, (usually transition metals) and the $SO_3$ sorbents (usually a metal oxide from either group IA or IIA) can be easily incorporated into the layers or in the galleries of LDH materials, using inexpensive starting materials.

Thus the present invention relates to uses of layered double hydroxide compositions, more specifically hydrotalcite-like and hydrocalumite-like materials for the absorption of $SO_x$ from flue gas streams. Also described herein is the incorporation of other metal components, preferably transition metal ions, capable of promoting the oxidation of sulfur dioxide to sulfur trioxide at calcination temperatures. These second metal components are incorporated in the form of metal polyoxoanions into the LDH by intercalation.

LDH sorbents react at different temperatures, particularly at 500° to 1000° C., with $SO_2$ such that the sorbents find particular use in diminishing the emissions of sulfur oxides from the coal-fired boilers.

Considered here are also ways of recycling the spent sorbents, (i) by removing the entrapped $SO_x$ at high temperatures and/or (ii) by disposing of them as solid waste.

Thus the present invention uses layered double hydroxide compositions, more specifically hydrotalcite-like and hydrocalumite-like materials of the formula, $[M_{1-x}^{II}M_x^{III}(OH)_2](A_{x/n})^{n-} \cdot yH_2O$ wherein $M^{II}$ is a divalent metal and $M^{III}$ is a trivalent metal, A is an anion of charge n-, and x is between 0.8 to 0.12, which are suitable for the absorption of $SO_x$. Both $M^{II}$ and/or $M^{III}$ comprise in total or in part metals (preferably from group IIA, IIB and IIIA) that form reactive basic oxides at calcination temperatures (preferably above 500° C.) that are capable of reacting with $SO_x$. Accordingly, the preferred LDHs for use in the present invention comprise of these metals in the brucite-like $[Mg(OH)_2$-like] layers, in particular magnesium and aluminum. Other alkaline earth metal ions, such as calcium, strontium, barium and mixtures thereof may replace all or part of magnesium ions.

In a broader sense this invention considers the use of these LDH sorbents in controlling the sulfur oxides from gas streams, more particularly from coal-fired boiler systems. These systems include a boiler, economizer and dust collectors such as electrostatic precipitator or bag filter house ("bag house"). The injection of the sorbents into these, particularly to the boiler (700–1000° C.), along with the coal, or onto the electrostatic precipitators (hot side temp. 400–500° C. has been considered in this invention. Thus, the LDH sorbents were thermally treated in a temperature-programmed thermogravimetric balance at a temperature in the range of 500° to 1000° C. in a stream of air or nitrogen, and $SO_x$ gas was introduced. The amount of $SO_2$ that reacted with the sorbents was monitored as the weight uptake.

The reaction of the hydrotalcite sorbent, $[Mg_6Al_2(OH)_{16}](CO_3) \cdot xH_2O$ (abbreviated as Mg$_3$Al-LDH) with $SO_2$ provided a general description of the typical experimental method used to investigate the LDH reactivity. The hydrotalcite was heated to 700° C. under a stream of air in a temperature controlled thermogravimetric balance at a rate of 5° C./min. The sample was calcined at 700° C. for further one hour. During the above calcination process the sample lost weight due to the removal of $CO_2$ and $H_2O$. This sample was then exposed to $SO_2$-containing gas stream at 0.5% v/v concentration, at a flow rate of 200 ml/min. A weight gain of 6.2 % was observed. This corresponded to the amount of $SO_x$ absorbed to form the metal sulfate, $MgSO_4$. The diffraction peaks observed in the X-ray diffraction pattern of the final product were due to crystalline $MgSO_4$, indicating that the magnesium sites were the reactive species at this temperature. The weight uptake observed corresponded to a 4.4% conversion of MgO to $MgSO_4$. However, this value is low compared to the other modified sorbents described later in this invention.

A third metal component is incorporated in the LDH to promote the oxidation of sulfur dioxide to sulfur trioxide. The third metal component is preferably a component of a metal selected from the transition metals, rare earth metals, and Group IVA in the periodic table. Some of the known transition metal and transition metal oxide catalysts that are suitable for $SO_2$ oxidation include, Pt, $WO_3$, Ag, $Ag_3VO_4$, $Cu_3(VO_4)_2$, $V_2O_5$, $Fe_2O_3$, $TiO_2$, CuO, $CrO_3$, $MnO_2$, $PbO_2$, $MoO_3$, $CeO_2$, $Cr_2O_3$, $SnO_2$ and ZnO. Platinum is an excellent oxidation catalyst, and other oxides such as vanadium pentoxide and iron oxides are also especially effective for catalyzing the oxidation of $SO_2$ to $SO_3$. See for example, Neuwmann et al in Z. Electrochem. 38, 304 to 310 (1932). The catalytic process on these oxides will involve the following steps: sorption of $SO_2$ to form a sulfite, oxidation of sulfite to sulfate, and sulfate decomposition with evolution of $SO_3$. Thus, for a particular metal oxide sorbent, the selection of a good metal oxide catalyst for $SO_2$ oxidation is very important. Requirements for a good catalyst can be compared to those for the $SO_2$ sorbent. For the catalyst, all three steps are surface reactions and should occur at the reaction temperature. For the $SO_2$ sorbent, the first two steps should occur as bulk reactions converting much of the sorbent to sulfate during sorption at the reaction temperature. The last step should occur at a higher temperature.

Particularly good results were achieved as disclosed in this invention when transition metals, especially iron or vanadium, were introduced to the LDH as the third metal. These metals were incorporated into the LDH sorbent compositions by structural means during the synthesis. As disclosed in this invention, metal components are introduced into the galleries between $[M_{1-x}^{II}M_x^{III}(OH)_2]$ layers in such a way, that a part or whole of $A^{n-}$ in the LDH structure, $[M_{1-x}^{II}M_x^{III}(OH)_2](A_{x/n})^{n-}\cdot H_2O$ is replaced by anions containing sulfur dioxide oxidizing metals described earlier. Accordingly, the anions that contain metal ions, such as copper, zinc, cobalt, iron, cadmium, mercury, lead, manganese, tin, nickel, palladium, chromium, vanadium, manganese, gallium, boron, cobalt, and mixtures thereof may replace all or part of gallery anion $A^{n-}$ in the LDH structure.

Thus, the anions can be one or more from metal anionic complexes such as oxalates (ox), $Fe(ox)_3{}^{3-}$, simple oxo-anions such as, $CrO_4{}^{2-}$, $FeO_4{}^{2-}$, $MnO_4{}^-$, etc., or larger oxo-anions with higher charge such as, $V_{10}O_{28}{}^{6-}$, $W_7O_{24}{}^{6-}$, $Mo_7O_{24}{}^{6-}$ etc. or anions like $BVW_{10}O_{40}{}^{7-}$, $H_2W_{12}O_{40}{}^{6-}$, $SiV_3W_9O_{40}{}^{7-}$ polyoxometalates with Keggin-type structure or $BCoW_{11}O_{39}{}^{7-}$, $SiW_{11}O_{39}{}^{8-}$, $PMo_2W_9O_{39}{}^{7-}$ polyoxometalates with lacunary-type (defect) Keggin structure or anions such as $BCoW_{12}O_{42}{}^{8-}$ containing fused Keggin-type structure. Intercalation of these anions with different sizes, not only help $SO_2$ to oxidize to $SO_3$, but also introduce microporosity in the LDH structure and allow ready access of reacting $SO_2$ molecules.

The incorporation of guest anions into the hydrotalcite structure was carried out by replacing $CO_3{}^{2-}$ from the gallery as follows: The hydrotalcite material with suitable Mg/Al ratio was first calcined at 500° C. and then hydrolyzed in aqueous solutions under anaerobic conditions to reform the hydrotalcite-like LDH containing $OH^-$ as the gallery anion. This $OH^-$ in the gallery can easily be replaced by wide variety of anions, such as $FeO_4{}^{2-}$, $CrO_4{}^{2-}$, $Fe(ox)_3{}^{3-}$ etc., or larger anions such as $V_{10}O_{28}{}^{6-}$, $W_7O_{24}{}^{6-}$ or much larger anions with Keggin structure such as $H_2W_{12}O_{40}{}^{6-}$, $BVW_{10}O_{40}{}^{7-}$, $SiV_3W_9O_{40}{}^{7-}$ etc., or lacunary structure such as $SiW_{11}O_{39}{}^{9-}$, $BCoW_{11}O_{39}{}^{7-}$, etc. The products isolated showed X-ray diffraction peaks corresponding to crystalline phases with well-defined basal spacings (Table 1).

TABLE 1

Basal Spacings for the LDHs of the type
$[M^{II}{}_{1-x}M^{III}{}_x(OH)_2](A^{n-})_{x/n}\cdot yH_2O$

| Layer Metals | | Gallery Anion | |
|---|---|---|---|
| $M^{II}$ | $M^{III}$ | $A^{n-}$ | Basal Spacing |
| Mg | Al | $CO_3{}^{2-}$ | 7.7 |
| | | $OH^-$ | 7.7 |
| | | $FeO_4{}^{2-}$ | 7.9 |
| | | $CrO_4{}^{2-}$ | 8.0 |
| | | $HVO_4{}^{2-}$ | 7.9 |
| | | $MoO_4{}^{2-}$ | 7.8 |
| | | $V_{10}O_{28}{}^{6-}$ | 11.8 |
| | | $Mo_7O_{24}{}^{6-}$ | 12.0 |
| | | $W_7O_{24}{}^{6-}$ | 12.1 |
| | | $SiV_3W_9O_{40}{}^{7-}$ | 14.9 |
| | | $SiW_{11}O_{39}{}^{8-}$ | 14.2 |
| | | $H_2W_{12}O_{40}{}^{6-}$ | 14.7 |
| | | $BCoW_{11}O_{39}{}^{7-}$ | 14.5 |
| | | $BVW_{11}O_{40}{}^{7-}$ | 14.5 |
| Zn | Al | $NO_3{}^-$ | 7.7 |
| | | $V_{10}O_{28}{}^{6-}$ | 11.7 |
| | | $H_2W_{12}O_{40}{}^{6-}$ | 14.0 |
| | | $PMo_2W_9O_{39}{}^{7-}$ | 14.7 |
| | | $CoW_{12}O_{42}{}^{8-}$ | 14.7 |
| | | $BCoW_{11}O_{39}{}^{7-}$ | 14.2 |
| | | $BVW_{11}O_{40}{}^{7-}$ | 14.7 |
| | | $PW_9O_{34}{}^{9-}$ | 14.7 |
| | | $SiV_3W_9O_{40}{}^{7-}$ | 14.7 |
| | | $SiW_{11}O_{39}{}^{8-}$ | 15.2 |

The incorporation of the guest polyoxomatalate anions into the Zn/Al-LDH was also carried out in a similar manner starting with an aqueous hot suspension of $[Zn_2Al(OH)_6](NO_3)\cdot xH_2O$ (referred to as $Zn_2Al$-LDH) and was found to undergo complete intercalative ion exchange reaction with aqueous solutions of polyoxometalatge anions including alpha-$[H_2W_{12}O_{40}]^{6-}$ and alpha-$[SiV_3W_9O_{40}]^{7-}$ alpha-Keggin-type ions or lacunary (defect) Keggin-type ions such as $SiW_{11}O_{39}{}^{9-}$, $BCoW_{11}O_{39}{}^{7-}$. The anions with lower charge such as $[PW_{12}O_{40}]^{3-}$ and $[SiW_{12}O_{40}]^{4-}$ show no ion exchange whereas, intermediate anions show partial intercalation (e.g. $[PCuW_{11}O_{39}(H_2O)]^{5-}$). Furthermore, polyoxometalate anions with beta-Keggin structure such as beta-$[SiV_3W_9O_{40}]^{7-}$ undergo partial intercalation. See Kwon, T. and Pinnavaia, T. J., "Pillaring of a Layered Double Hydroxide by Polyoxometalates with Keggin-Ion Structures", Chemistry of Materials, 1, 381 to 383 (1989).

The preparation of several polyoxometalate intercalated Zn/Al- and Mg/Al-LDH materials starting from corresponding nitrate or chloride containing LDH has been disclosed by Woltermann in U.S. Pat. No. 4,454,244. However, in our hands, under the conditions mentioned the products formed were X-ray amorphous as judged by the absence of distinct Bragg reflections. Nevertheless, these polyoxometalate intercalated amorphous materials as well as partially intercalated LDHs described earlier also showed enhanced $SO_x$ uptakes compared to their precursors.

In certain preferred embodiments discussed in this invention, hydrotalcite-like $Mg_3Al$-LDHs, when intercalated with $Fe(ox)_3{}^{3-}$, $FeO_4{}^{2-}$, $V_{10}O_{28}{}^{6-}$, $W_7O_{24}{}^{6-}$ and $Mo_7O_{24}{}^{6-}$, gave better $SO_x$ sorption than normal hydrotalcite (Table 2).

TABLE 2

SO$_2$ Uptake by
[M$_{1-x}^{II}$M$_x^{III}$(OH)$_2$](A$^{n-}$)$_{x/n}$·yH$_2$O at 700° C.

| Layer Metals | | Gallery Anion | |
|---|---|---|---|
| M$^{II}$ | M$^{III}$ | A$^{n-}$ | % Conversion$^a$ |
| Mg | Al | CO$_3^{2-}$ | 4.4 |
|  |  | OH$^-$ | 12.5 |
| Mg/Al = 3/1 |  | FeO$_4^{2-}$ | 85.2 |
|  |  | Fe(ox)$_3^{3-}$ | 67.8 |
|  |  | CrO$_4^{2-}$ | 15.7 |
|  |  | HVO$_4^{2-}$ | 34.2 |
|  |  | MoO$_4^{2-}$ | 13.8 |
|  |  | V$_{10}$O$_{28}^{6-}$ | 45.6 |
|  |  | Mo$_7$O$_{24}^{6-}$ | 34.8 |
|  |  | W$_7$O$_{24}^{6-}$ | 24.8 |
|  |  | SiV$_3$W$_9$O$_{40}^{7-}$ | 40.3 |
|  |  | SiW$_{11}$O$_{39}^{8-}$ | 26.4 |
|  |  | H$_2$W$_{12}$O$_{40}^{6-}$ | 28.7 |
|  |  | BCoW$_{11}$O$_{39}^{7-}$ | 26.9 |
|  |  | BVW$_{11}$O$_{40}^{7-}$ | 43.4 |
| Zn | Al | NO$_3^-$ | 10.2 |
|  |  | V$_{10}$O$_{28}^{6-}$ | 43.1 |
| An/Al = 2/1 |  | H$_2$W$_{12}$O$_{40}^{6-}$ | 40.1 |
|  |  | PMo$_2$W$_9$O$_{39}^{7-}$ | 26.5 |
|  |  | CoW$_{12}$O$_{42}^{8-}$ | 25.2 |
|  |  | BCoW$_{11}$O$_{39}^{7-}$ | 17.1 |
|  |  | BVW$_{11}$O$_{40}^{7-}$ | 11.3 |
|  |  | PW$_9$O$_{34}^{9-}$ | 18.5 |
|  |  | SiV$_3$W$_9$O$_{40}^{7-}$ | 15.2 |
|  |  | SiW$_{11}$O$_{39}^{8-}$ | 14.7 |

$^a$Fraction of Mg as MgO converted to MgSO$_4$ after 1 hour reaction time.

In these cases, iron, vanadium, tungsten and molybdenum oxides act as SO$_2$ oxidation catalysts. Similarly, Zn$_2$Al-LDH when intercalated with the same polyoxo anions (Table 2) also showed enhanced SO$_x$ uptake relative to the Zn$_2$Al-NO$_3$ LDH precursor.

Furthermore, it was found that, Mg$_3$Al and Zn$_2$Al-LDH sorbents prepared with POM anions intercalated partially in the galleries, as well as amorphous LDH-POM reaction products, also produce suitable SO$_x$ sorbents. All these materials showed enhanced SO$_x$ uptake relative to their precursor LDHs, [Zn$_2$Al(OH)$_6$]-(NO$_3$)·xH$_2$O or [Mg$_3$Al$_2$(OH)$_{16}$](OH)·xH$_2$O. For example the V$_{10}$O$_{28}^{6-}$ intercalated crystalline Zn$_2$Al-LDH showed a weight uptake of 23.6% at 700° C. under the conditions described earlier in this invention. The corresponding amorphous material showed a 20% weight uptake at this temperature. The crystalline sorbent formed by intercalating Zn$_2$Al-LDH with alpha-[SiV$_3$W$_9$O$_{40}$]$^{7-}$ showed 5.78% weight uptake at 700° C. with SO$_x$ whereas, the partially intercalated sorbent with beta-[SiV$_3$W$_9$O$_{40}$]$^{7-}$ in the gallery showed 5.12% weight uptake under similar conditions.

Figure 2:
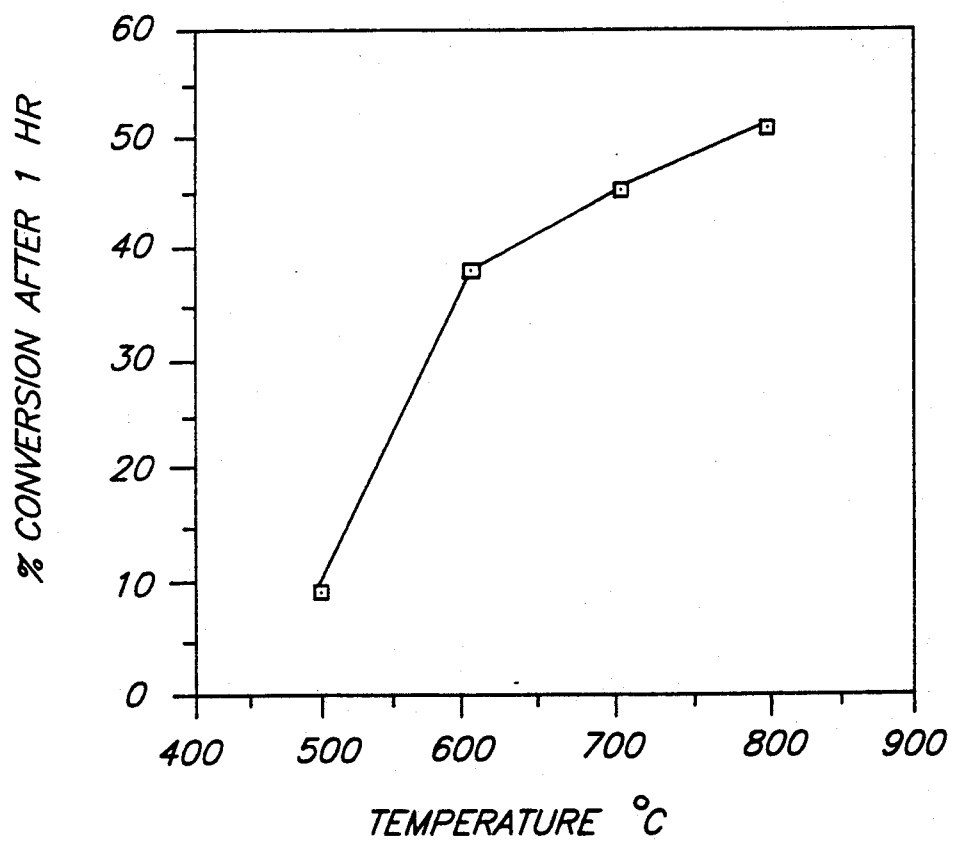
FIG. 2 is a graph showing the temperature dependence for $SO_2$ uptake by $[Mg_6Al_2(OH)_{16}](V_{10}O_{28})_{1/3} \cdot xH_2O$.

In another embodiment, Mg$_3$Al-LDH intercalated with V$_{10}$O$_{28}^{6-}$, [Mg$_6$Al$_2$(OH)$_{16}$](V$_{10}$O$_{28}$)$_{1/3}$·xH$_2$O was subjected to air containing 0.5% SO$_2$ (v/v) in the temperature range 500°–800° C. As evident by the uptake measurements (FIG. 2), better SO$_x$ sorption was seen in the temperature range 600°–800° C.

In one embodiment the possibility of regenerating these spent LDH sorbents for recycling was considered. It was found that spent Zn$_2$Al-LDH sorbents after exposing to SO$_2$ at 700° C., release entrapped SO$_x$ (and/or H$_2$SO$_4$) upon further thermal treatment, as evident by their weight loss (Table 3).

TABLE 3

Thermal Decomposition of Spent
[Zn$_2$Al(OH)$_6$](A$^{n-}$)$_{l/n}$·yH$_2$O Sorbents at 700° C.

| Gallery Anion A$^{n-}$ | % Sulfate Decomposed in Absence of SO$_x^a$ |
|---|---|
| NO$_3^-$ | 0.00 |
| V$_{10}$O$_{28}^{6-}$ | 22.0 |
| H$_2$W$_{12}$O$_{40}^{6-}$ | 19.5 |
| PMo$_2$W$_9$O$_{39}^{7-}$ | 14.7 |
| Co$_2$W$_{12}$O$_{42}^{8-}$ | 8.6 |
| BCoW$_{11}$O$_{39}^{7-}$ | 17.4 |
| PW$_9$O$_{34}^{9-}$ | 2.0 |
| SiV$_3$W$_9$O$_{40}^{7-}$ | 66.0 |
| SiW$_{11}$O$_{39}^{9-}$ | 20.1 |
| BVW$_{11}$O$_{40}^{7-}$ | 42.3 |

Figure 3:
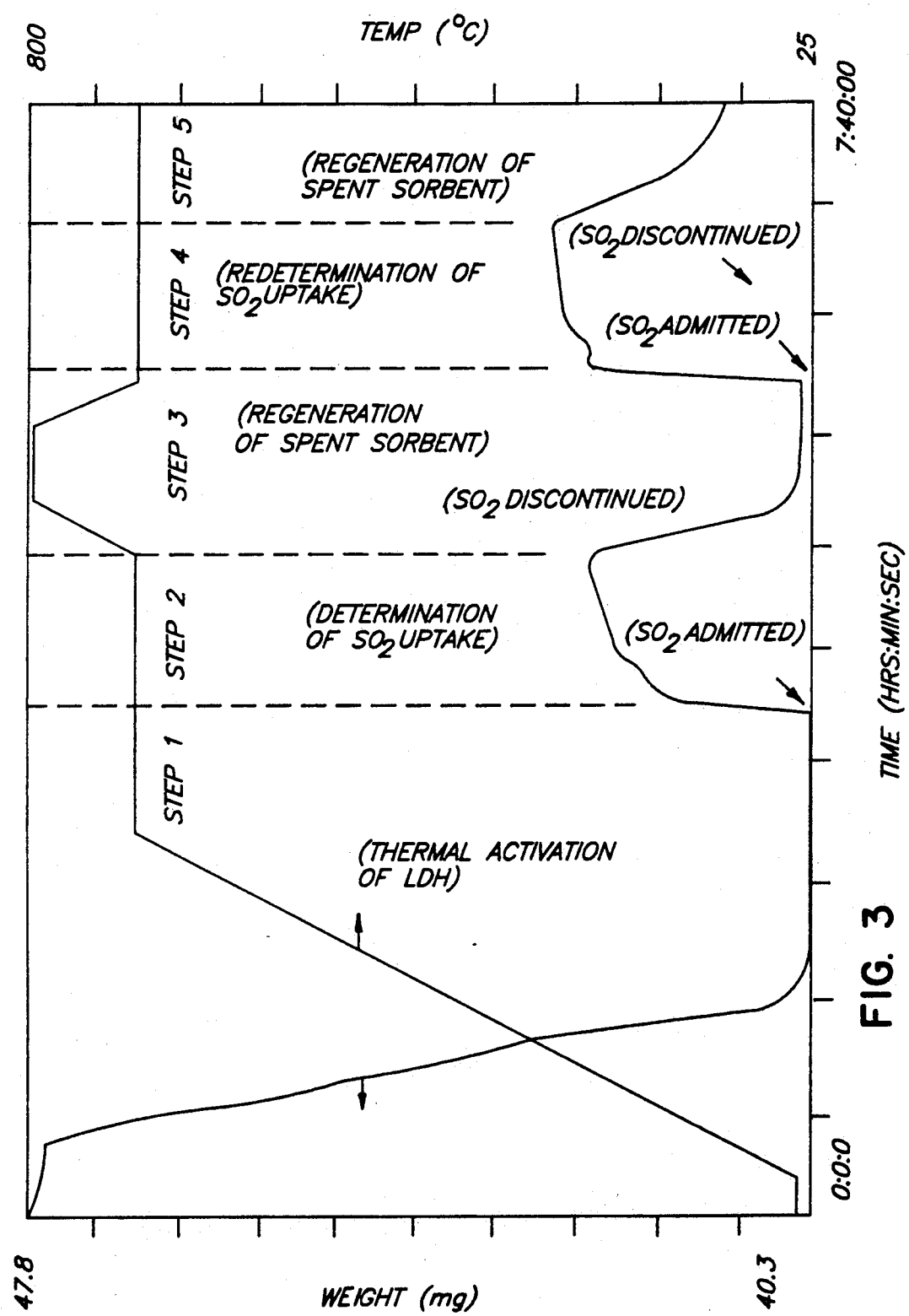
FIG. 3 is a graph of a TGA plot for $SO_2$ uptake by $[Zn_2Al(OH)_6](SiV_3W_9O_{40})_{1/7} \cdot xH_2O$ and thermolysis of the spent sorbent.

$^a$expressed as, $\frac{\% \text{ weight loss in absence of SO}_2}{\% \text{ weight uptake in presence of SO}_2} \times 100$ For example, a Zn/Al-LDH containing SiV$_3$W$_9$O$_{40}^{7-}$ polyoxometalate anions showed a 5.78% weight uptake at 700° C. in the presence of air containing 0.5% SO$_2$ (v/v). In the absence of SO$_2$ in a stream of air at 900° C., this spent sorbent (now in the sulfate form) released all of its bound SO$_x$ to regain the initial weight prior to SO$_2$ treatment and to reform the oxide sorbent. This reformed sorbent had a similar activity as the initial sorbent for the reaction with SO$_x$ (FIG. 3). Thus, the SO$_x$ sorbent can be recycled, if desired by appropriate control of absorption/desorption temperatures.

Figure 4:
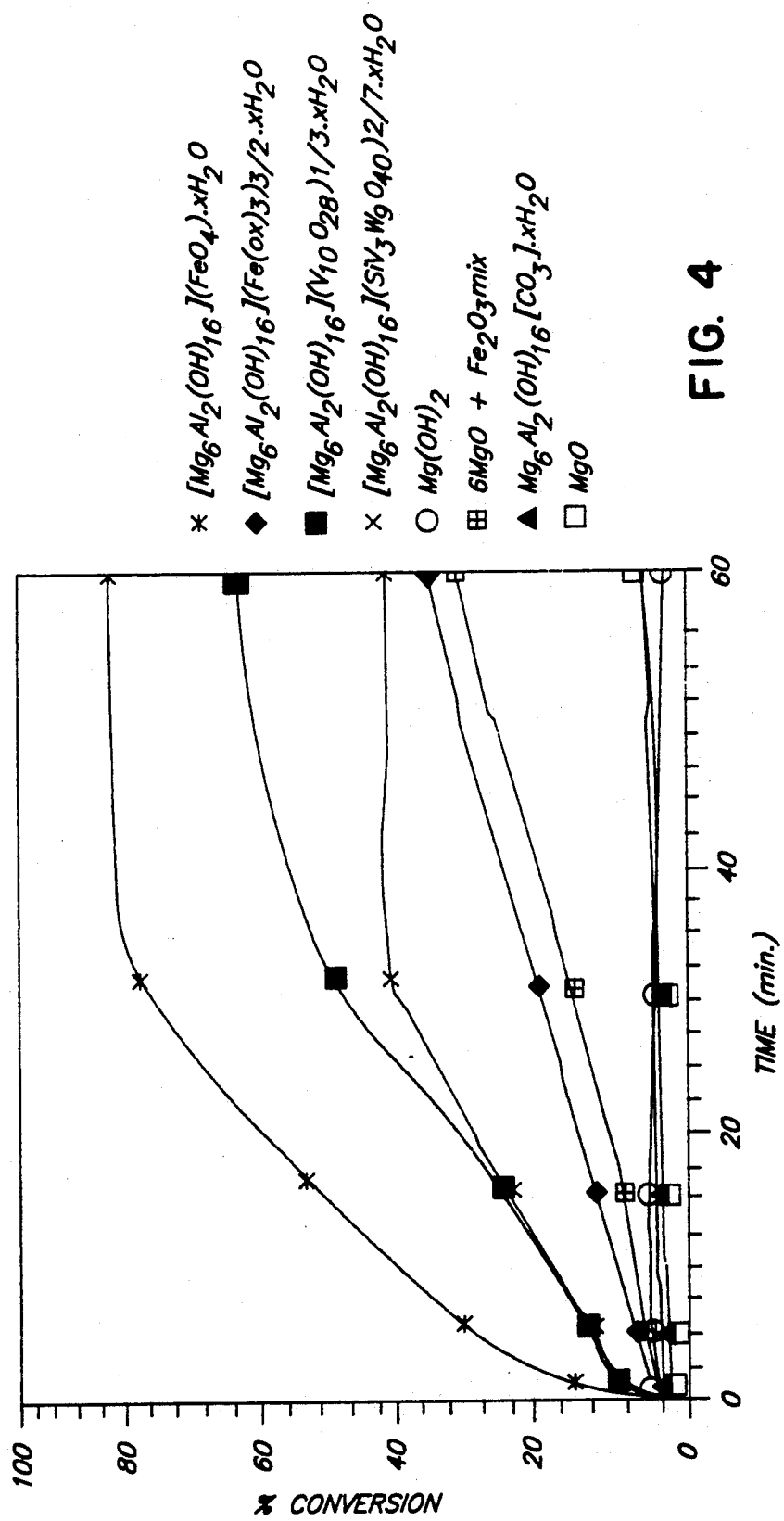
FIG. 4 is a graph comparing the rate of $SO_2$ uptake by different Mg containing sorbents prepared according to this invention and sorbents presently used in flue gas desulfurization.

The uptake of SO$_x$ as a function of time for some of the Mg$_3$Al sorbents discussed in this invention is given in FIG. 4. Compared to conventional basic sorbents such as MgO and Mg(OH)$_2$, the sorbents disclosed in this invention, especially when the gallery anions containing iron in the layered double hydroxide structure, exhibit superior initial and overall SO$_x$ sorptivity. Under specific reaction conditions, i.e., at 700° C. in a gas stream containing 0.5% SO$_2$ and air, for example MgO was found to undergo 10.2% conversion of MgO sites to MgSO$_4$ and Mg(OH)$_2$ was found to undergo 14.0% conversion during a period of 1 hour. Incorporation of iron as Fe$_2$O$_3$ to MgO by (MgO:Fe$_2$O$_3$=3:1) by mixing enhanced the conversion to 36.5%. Conversely, similar mixing experiment with Mg(OH)$_2$ [Mg(OH)$_2$:Fe(OH)$_3$=3:1] showed reduced uptakes (9% conversion). Under the same set of reaction conditions Mg$_3$Al-LDH (Mg:Al=3:1) containing FeO$_4^{2-}$ ions and Fe(ox)$_3^{3-}$ anions in the galleries as disclosed in this invention exhibited 85.2% and 67.8% conversion of Mg sites to MgSO$_4$, respectively. These values are much superior to MgO or Mg(OH)$_2$ with or without iron. The LDH sorbents intercalated with vanadium containing anions such as V$_{10}$O$_{28}^{6-}$, HVO$_4^{2-}$, SiV$_3$W$_9$O$_{40}^{7-}$ and BVW$_{10}$O$_{40}^{7-}$ also showed better SO$_x$ uptake values (Table 2 and FIG. 4). Moreover, these polyoxometalate anions intercalated LDH sorbents exhibited better initial SO$_x$ uptake than MgO or Mg(OH)$_2$.

European patent EP-A 278 535, which was described herein earlier, disclosed hydrocarbon cracking catalyst compositions containing as a component, anionic clays with LDH structures, for the purpose of binding the SO$_x$ liberated in the refining process, especially when processing high sulfur feeds. The LDH components incorporated many of the known SO$_2$ oxidation catalysts, including rare earth metal ions (e.g., La$^{3+}$, Ce$^{3+}$), noble metals (e.g., Pt, Rh) and transition metal ions (Cu$^{2+}$, Fe$^{+3}$, Mn$^{2+}$, Cr$^{3+}$). The rare earth and noble metal catalysts were preferred over the transition metal catalysts, in part, because of their greater reactivity.

Also, it is known to those skilled in the art that transition metals, particularly iron, are undesirable constituents of petroleum cracking catalysts because they promote the formation of coke. However, iron is an economically attractive $SO_2$ oxidation catalyst for applications where coke formation is not a concern, such as in the reduction of $SO_x$ from the flue gases of coal-burning power plants.

In the preferred invention described herein, we disclose in part that the effectiveness of transition metal ions (particularly iron and vanadium) in promoting $SO_2$ uptake by LDH materials depends substantially on the transition metal composition. The incorporation of transition metals into the galleries of LDH structure affords an order of increase in $SO_x$ absorption. This teaching is illustrated by the results presented in Table 2 for $SO_2$ uptake at 700° C. by $Mg_3Al$ and $Zn_2Al$-LDH compositions with different gallery anions consisting of $SO_2$ oxidation catalysts. In the present invention, when the oxidation catalyst iron when incorporated to the galleries of the LDH structure in the form of $FeO_4^{2-}$ for example, showed an enhancement of $SO_x$ uptake capability of hydrotalcite from 12.5% conversion of Mg sites to $MgSO_4$ to 85.2%. This is about 72.7% improvement of utilizing the Mg sites for SO uptake. Furthermore, incorporation of other iron containing anions such as $Fe(ox)_3^{3-}$ as well as vanadium containing polyoxometalate anions showed significant improvements in $SO_x$ uptake capabilities of the LDH sorbents. Thus, iron and vanadium are preferred as $SO_2$ oxidation catalyst for the sorbents disclosed in this invention which are fabricated to use in flue gas desulfurization processes.

Most of the sorbents disclosed in this invention contained $Mg^{2+}$ as the MII cation. Alternatively, $Ca^{2+}$ containing LDHs such as hydrocalumite and its derivatives also could be used as sorbents for $SO_x$ scrubbing after intercalating with said polyoxometalate. These materials should have similar or superior $SO_x$ sorptivity as judged by reactivity of CaO with $SO_2$ and $SO_3$ (see above, background of the invention).

The metal-containing LDH useful as precursor for the preparation of compositions disclosed in the present invention may be synthesized from inexpensive starting materials. For example, hydrotalcite-like materials can be prepared starting with MgO and alumina ($Al_2O_3$) and hydrocalumite-like materials from CaO and alumina. Both CaO and MgO can be obtained by calcining the natural minerals such as Calcite ($CaCO_3$) and Magnesite ($MgCO_3$). Some of these layered double hydroxides, such as hydrotalcite, are commercially available and some may be naturally occurring. Moreover, methods for their synthesis are known in the art.

The $SO_2$ oxidation catalysts can be incorporated into the galleries of the LDHs using wide variety of different metal containing anions other than the ones disclosed in this invention. These include, among other things, metal carbonyls such as $V(CO)_6^-$, $Fe_2(CO)_8^{2-}$, $Fe(CO)_4^{2-}$, $Fe_3(CO)_{11}^{2-}$, $Cr(CO)_5^{2-}$ etc., or metal halides such as $VCl_4^-$, $CrCl_6^{3-}$, $W_2Cl_9^{3-}$, $FeCl_6^{3-}$ etc., or metal nitriles such as $Mn(CN)_6^{4-}$, $W(CN)_8^{4-}$, $Fe(CN)_6^{3-}$ etc. or transition metal complex chelates such as metal-oxalates, $Fe(ox)_2^{2-}$, $WO_2(ox)^-$, $Cr(ox)_3^{3-}$, or metal-acetylacetonates etc.

It is known to those skilled in the art that some of the transition metals, particularly iron, is capable of oxidizing NO to $NO_2$. Thus, the transition metal-containing LDH sorbents, especially the iron-containing sorbents disclosed in this invention may be used to remove $NO_x$ components from flue gas streams and other gas streams. In the gas streams, the calcined LDHs will react with $NO_x$ components to form solid nitrates.

These sorbents may be used, for example, in the form of particles of any suitable size and shape. Such particles may be formed by conventional techniques, such as spray drying, pilling, tableting, bead formation and the like.

In the coal-fired boiler application, the present sorbents may be added, either separately or with coal, to the combustion zone, (e.g., the boiler, temp. 700–1000° C.) when combustion takes place. Sorbents then leave the combustion zone with coal ash and can be removed from the bag house. This process will in turn, provide enough contact time for the sorbents to react with $SO_x$ from the flue gas streams. Thus the flue gas leaving the combustion zone/contacting zone systems have reduced amounts of sulfur oxide relative to the processing in the absence of present sorbents. If necessary, reacted sorbents can be separated from the ash, (especially the sorbents with Zn and Al, for the regeneration), e.g., by screening, density separation, or other well-known solid separation techniques. Moreover, the spent sorbents can be safely disposed without any serious environmental pollution, since $SO_x$ in the spent sorbents is now in a thermally stable sulfate form. Furthermore, sorbents disclosed herein could be used in other processes such as hydrocarbon cracking processes where diminision of $SO_x$ from gas streams are necessary.

The following examples will serve to illustrate certain embodiments of the herein disclosed invention. These Examples should not, however, be construed as the limiting scope of the novel invention as there are many variations which may be made thereon without departing from the theme of the disclosed invention.

EXAMPLE 1

The preparation of a hydrotalcite-like $Mg_3Al$-LDH is described in this example.

A solution of 12.8 g $Mg(NO_3)_2 \cdot 6H_2O$ and 9.4 g $Al(NO_3)_3 \cdot 9H_2O$ in 100 ml deionized water was added to a solution containing 14 ml 50% NaOH and 5 g $Na_2CO_3$ (anhydr.) in 200 ml distilled water. The addition was carried out very slowly over a period of 90 minutes, with vigorous stirring. Following the addition, the resulted heavy slurry was heated at $65 \pm 5°$ C. for 18 hours with good mixing. The mixture was then cooled to room temperature, and the precipitate was separated by centrifugation. The solid was washed several times with deionized water until the washings were free of salts and then dried in air. The X-ray diffraction pattern of the dried solid was corresponded to hydrotalcite and the basal spacing was found to be 7.78 Å. Chemical analysis showed the Mg/Al ratio to be 3.2, very near the value expected for hydrotalcite with an idealized formula unit of $[Mg_3Al(OH)_8](CO_3)_{0.5} \cdot xH_2O$.

By changing the amounts of $Mg^{2+}$ and $Al^{3+}$ salts used, one can prepare hydrotalcite-like materials with different Mg/Al ratios.

EXAMPLE 2

The preparation of $[Zn_2Al(OH)_6]X \cdot zH_2O$ (X=$NO_3$, Cl) is described in this example.

All the manipulations were carried out under a $N_2$ atmosphere and the solvents were pre-boiled for about 2 hours under $N_2$ before use.

To a 200 ml solution of 0.1M Al(NO$_3$)$_3$.9H$_2$O was added a 1.0 M solution of NaOH until the pH of the solution was 7. The white slurry was stirred for one hour, and a 200 ml solution of 0.3M Zn(NO$_3$)$_2$ was added drop-wise. The pH of the mixture was maintained at about 6.0, by adding NaOH during the addition. The resulting slurry was boiled for 24 hours under a nitrogen atmosphere. (Upon boiling this suspension for one week produced products with high crystallinity.) The product, [Zn$_2$Al(OH)$_6$]NO$_3$.zH$_2$O was washed several times with water by centrifugation, and dried in air. The X-ray diffraction powder pattern of the dried solid corresponded to a LDH structure powder pattern of the dried solid corresponded to a LDH structure with a basal spacing value of 7.7 Å. Employing a similar method, the Cl$^-$ derivative, [Zn$_2$Al(OH)$_6$]Cl.zH$_2$O can be prepared using AlCl$_3$ and MgCl$_2$.

By changing the amounts of Zn$^{2+}$ and Al$^{3+}$ salts used hydrotalcite-like materials with different Zn/Al ratios can be prepared.

EXAMPLE 3

A general method for the preparation of polyoxometalate intercalated Zn/Al hydrotalcite-like materials with the general formula [Zn$_2$Al(OH)$_6$]-(POM$^{n-}$)$_{1/n}$.xH$_2$O where POM is a polyoxometalate anion of charge n is described in this example.

A boiling solution containing about 5 mequiv. portion of Zn$_2$Al-X (X=NO$_3$, Cl) LDH prepared in Example 2, was added drop-wise to a stirred aqueous solution containing about 7.5 mequiv. of polyoxometalate anion. After the additions was complete, the pH of the resultant slurry was adjusted to about 6 by adding dilute HNO$_3$ acid. The slurry was stirred for about 1 hour and the solid product was isolated and washed thoroughly with water by centrifugation. The X-ray diffraction powder patterns of the dried solids correspond to a hydrotalcite-like layered structures, with polyoxometalate anions in the gallery. The basal spacings are given in Table 1. Chemical analyses conformed to the structure Zn$_2$Al(OH)$_6$[POM$^{n-}$]$_{1/n}$.YH$_2$O, where POM represent the polyoxometalate with a charge of n.

The anions with lower charge such as [PW$_{12}$O$_{40}$]$^{3-}$ and [SiW$_{12}$O$_{40}$]$^{4-}$ show no ion exchange, whereas intermediate anions show partial intercalation (e.g. [PCuW$_{11}$O$_{39}$(H O)]$^{5-}$). Furthermore, polyoxometalate anions with beta-Keggin structure such as beta-[SiV$_3$W$_9$O$_{40}$]$^{7-}$ undergo partial intercalation. The preparation of polyoxometalate intercalated Zn/Al-LDH materials from [Zn$_2$Al(OH)$_6$]NO$_3$.zH$_2$O according to the U.S. Pat. No. 4,454,244 disclosed by Woltermann resulted in X-ray amorphous materials.

EXAMPLE 4

The preparation of a Mg/Al LDH of the formula, [Mg$_6$Al$_2$(OH)$_{16}$]OH.xH$_2$O LDH from hydrotalcite is described in this example.

A sample of hydrotalcite, prepared according to Example 1, was calcined at 500° C. for three hours. A 5 gram portion of this sample was pulvarized and suspended in a 200 ml of hot (65° C.) degassed deionized water to form a white slurry. The resulting slurry was then stirred vigorously at 65° C. for one hour under an atmosphere of nitrogen, to form the hydroxide derivative [Mg$_3$Al(OH)$_8$]OH.xH$_2$O. The resulting slurry was cooled to room temperature and volume was adjusted to 250 ml with deionized water. The X-ray diffraction powder pattern of the dried solid corresponded to a hydrotalcite structure. The basal spacing was found to be 7.76 Å.

EXAMPLE 5

This example describes the general method adopted in preparing the polyoxometallate-intercalated Mg$_3$Al-LDHs.

A solution containing about 25 mmol portion of Mg$_3$Al LDH-OH slurry prepared according to Example 4 was added dropwise to stirred aqueous solution containing 40 mmols of polyoxometalate anion under an atmosphere of nitrogen. The resulting slurry was stirred at ambient temperature for about 18 hours and the solid product was isolated and washed thoroughly with water by centrifugation. The X-ray diffraction powder patterns of the dried solids corresponded to the hydrotalcite-like structure with intercalated polyoxometalates. The basal spacings are given in Table 1.

EXAMPLE 6

The uptake of SO$_x$ by various LDH sorbents was determined by thermogravimetric analysis using a Cahn Model TG-121 thermogravimetric analyzer.

Approximately 50-mg portions of the sorbent was placed on a quartz pan in the thermogravimetric balance. Subsequent treatment of the sample was carried out in a three step procedure.

Step 1: Under a flow of air as a carrier gas (200ml/min), sample was allowed to equilibrate at 25° C. for 15 minutes and slowly heated (5° C./min) to the calcining temperature, typically 700° C. The sample was maintained at this temperature for an additional 1 hour.

Step 2: SO$_2$ gas (0.5%) then was introduced into the carrier gas at the temperature and the weight was monitored for a 1 hour period. For the more reactive sorbents a rapid initial weight uptake of SO$_x$ was observed, especially with sorbents containing iron. The weight increase corresponded to the amount of SO$_3$ absorbed by the calcined sample (Table 2). For a typical TGA plot see FIG. 1.

Step 3: Passage of SO$_2$ into the carrier gas was ceased and the sample weight at reaction temperature was monitored for another 1 hour. This step was carried out in order to determine the thermal stability of the metal sulfate products formed after the reaction with SO$_x$. All of the samples containing Mg and Al in the layers showed little or no weight loss, whereas most of the samples that contained Zn in the layers showed a significant weight loss (Table 3).

EXAMPLE 7

Hydrotalcite-like materials intercalated with metal polyoxoanions as in Examples 3 and 5 were tested for SO$_x$ sorption at 700° C. according to the procedure of Example 6. The results are given in Table 2. LDHs that contain Mg and Al show better SO$_x$ adsorption than that contain Zn and Al. The preferred polyoxoanion is FeO$_4^{2-}$, which showed more than 85% conversion of Mg sites to MgSO$_4$ when exposed to SO$_2$. However, polyoxoanions containing V, W and Mo also show enhanced SO$_x$ adsorption, compared to free hydrotalcite. Compared to polyoxometalates intercalated Mg$_3$Al-LDHs, the corresponding Zn$_2$Al-LDH formed metastable products with SO$_x$. Upon further calcining in the absence of SO$_2$ (Step 3, Example 6), most of these spent sorbents lost weight (Table 3). Accordingly some of these spent sorbents can be regenerated for further use, (See Example 9).

EXAMPLE 8

The hydrotalcite-like material intercalated with $V_{10}O_{28}^{6-}$ according to Example 4, was tested for $SO_x$ sorption at different calcining temperatures according to the procedure of Example 6. Results are given in FIG. 2. Preferred calcining temperatures were in the range 550–800° C. where 32% to 52% conversion of Mg sites to $MgSO_4$ was observed. At very high temperatures (>900° C.) the uptake was very low.

EXAMPLE 9

Some of the $Zn_2Al$-LDHs intercalated with polyoxometalates according to Example 5, were regenerated after exposing to $SO_2$ and tested for the $SO_2$ re-adsorption using the following procedure.

Approximately a 50-mg portion of the $Zn_2Al$ LDH intercalated with $SiV_3W_9O_{40}^{8-}$ was tested for $SO_x$ uptake using the Steps 1 and 2 in the procedure given in Example 7, and sample was further treated as follows:

Step 3: Passage of $SO_2$ into the carrier gas was ceased and the sorbent was heated to 800° C. (5° C./min) and the temperature was maintained at this value for an additional 30 minutes and cooled down to 700° C. (−5° C./min).

Step 4: $SO_2$ gas (0.5%) was again introduced into the carrier gas at 700° C. for a 1 hour period.

Step 5: Passage of $SO_2$ was ceased and the reaction temperature was kept at 700° C. for another 1 hour period.

During Step 2, when $SO_2$ was introduced for the first time a weight uptake of 5.6% was observed (FIG. 3). Almost all (90%) of this weight gain was lost in Step 3 at higher temperatures from this spent sorbent, indicating the release of the absorbed $SO_x$. The $SO_3$ uptake by this regenerated sorbent was 6.4% in Step 4 indicating that this recovered material was as good as the virgin sorbent.

It is intended that the foregoing description be only illustrative of the present invention and that the present invention be limited only by the hereinafter appended claims.

We claim:

1. A process for removing the $SO_x$ components from a flue gas stream containing oxygen, sulfur dioxide and sulfur trioxide from the combustion of coal from a coal-fired boiler which comprises combusting the coal in the boiler to provide the flue gas stream and contacting the said gas stream with a heated sorbent composition at 400° to 1000° C. wherein the said sorbent before being heated is selected from the group consisting of a layered double hydroxide composition of formula:

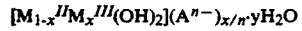

$$[M_{1-x}^{II}M_x^{III}(OH)_2](A^{n-})_{x/n}\cdot yH_2O$$

wherein $M^{II}$ is a divalent metal cation and $M^{III}$ is a trivalent metal cation selected from the group consisting of Group IIA, IIB and IIIA metals as the cation which form metal oxides and which are capable of reacting with $SO_2$ to form metal sulfites and $SO_3$ to form metal sulfates, A is an interlayer anion of charge n- which comprises at least one metal atoms selected from the group consisting of main group metals and transition metals which provide oxidation of sulfur dioxide to sulfur trioxide in an amount sufficient that said layered double hydroxide structure promotes the oxidation of the sulfur dioxide to the sulfur trioxide at the combustion conditions within the coal-fired boiler, wherein y is moles of water.

2. The process of claim 1, characterized in that the $M^{II}$ is at least in part an alkaline earth metal cation.

3. The process of claim 2 wherein said $M^{II}$ is at least in part alkaline metal cation selected from the group consisting of magnesium and calcium cations.

4. The process of claim 1 wherein said $M^{II}$ metal cation is at least in part selected from the group consisting of transition metal cations.

5. The process of claim 4 wherein said transition metal cation is a zinc cation.

6. The process of claim 1 wherein said $M^{III}$ cation is in part selected from the Group consisting of IIIA metal cations.

7. The process of claim 6 wherein the said metal cation is an aluminum cation.

8. The process of claim 1, wherein the anion A is a polyoxometalate anion.

9. The process of claim 8, wherein the said polyoxometalate anion is an isopolyoxometalate, which contains one metal atom and oxygen.

10. The process of claim 9, the said anions are selected from $CrO_4^{2-}$, $FeO_4^{2-}$, $HVO_4^{2-}$, $MoO_4^{2-}$, $V_{10}O_{28}^{6-}$, $Mo_7O_{24}^{6-}$ and $W_7O_{24}^{6-}$ and mixtures thereof.

11. The process of claim 8, wherein the said polyoxometalate anion is a heteropolyoxometalate, which contain more than one metal atom and oxygen.

12. The process of claim 11, wherein the said heteropolyoxometalate anion is an anion with a Keggin structure.

13. The process of claim 12, the said Keggin anion is selected from the group consisting of $H_2W_{12}O_{40}^{6-}$, $SiV_3W_9O_{40}^{7-}$ and $BVW_{10}O_{40}^{7-}$ mixtures thereof.

14. The process of claim 11, wherein the said heteropolyoxometalate anion is an anion with a lacunary (defect) Keggin structure having the formula $[XM_{11}O_{39}]^{n-}$ and $[XM_9O_{34}]^{n-}$ wherein one of X and M is a metal selected from the group consisting of main group metals and transition group metals.

15. The process of claim 14, the said lacunary (defect) Keggin anion is selected from the group consisting of $BCoW_{11}O_{39}^{9-}$ and $SiW_{11}O_{39}^{9-}$ and mixtures thereof.

16. The process of claim 11, wherein the said heteropolyoxometalate anion is an anion selected from robust anions consisting of fused Keggin-type structure.

17. The process of claim 16, wherein the said fused Keggin-type anion is $BCoW_{12}O_{42}^{8-}$.

18. The process of claim 1, wherein the A anion is a metal oxalate anion.

19. The process of claim 18 characterized in that, the metal oxalate (ox) anion is an iron oxalate.

20. The process according to claim 1 wherein $M^{II}$ is Zn is regenerated by heating to remove the bound $SO_x$ and to isolate the sorbent for reuse.

21. The process of claim 1 wherein the metal in the A anion is selected from the group consisting of iron, vanadium, molybdenum and tungsten.

22. The process of claim 1 wherein A anion is $FeO_4^{2-}$.

23. The process of claim 1 wherein the A anion is $Fe(oxaylate)_3^{3-}$.

24. The process of claim 1 wherein $M^{II}$ and $M^{III}$ from sulfur oxides at a first temperature in the coal fired boiler and are heated to a second higher temperature to remove the sulfur oxides and regenerate the heated sorbent composition for reuse.

* * * * *

UNITED STATES PATENT AND TRADEMARK OFFICE
CERTIFICATE OF CORRECTION

PATENT NO. : 5,114,691

DATED : May 19, 1992

INVENTOR(S) : Thomas J. Pinnavaia, Jayantha Amarasekera and Christine A. Polansky It is certified that error appears in the above—identified patent and that said Letters Patent is hereby corrected as shown below:

Column 1, line 26, "SO3", should be --$SO_3$--.

Column 8, line 30, "polyoxomatalate" should be --polyoxometalate--.

Column 8, line 37, "ometalatge" should be --ometalate--.

Column 8, line 66, "$Fe(ox)_{33}^{3-}$", should be --$Fe(ox)_3^{3-}$--

Column 11, line 35, "MII cation" should read --$M^{II}$ cation--.

Column 11, line 58, "$V(CO)_6$" should be --$V(CO)_6^-$--.

Column 12, line 29, "diminision" should be --diminution--.

UNITED STATES PATENT AND TRADEMARK OFFICE
CERTIFICATE OF CORRECTION

PATENT NO. : 5,114,691
DATED : May 19, 1992
INVENTOR(S) : Thomas J. Pinnavaia, Jayantha Amarasekera and Christine A. Polansky It is certified that error appears in the above—identified patent and that said Letters Patent is hereby corrected as shown below:

Column 12, line 56, "3.2" should be --3:2--.

Column 13, line 46, "$_{39}(HO)]^{5-}$)" should be --$_{39}(H_2O)]^{5-}$--.

Column 13, line 60, "pulvarized" should be --pulverized--.

Column 15, line 63, "atoms" should be --atom--.

Column 16, line 32, after "12," and before "the", --wherein-- should be inserted.

Column 16, lines 53 and 54, after "Zn" insert --and--.

Column 16, line 62, "Fe(oxaylate)" should be --Fe(oxylate--.

Column 16, line 63, "from" should be --form--.

Signed and Sealed this

Third Day of August, 1993

Attest:

MICHAEL K. KIRK

Attesting Officer    Acting Commissioner of Patents and Trademarks